Sheet 1.

C. O. HANSEN.
Improvement in Sawing Machines.
No. 119,139.

Patented Sep. 19, 1871.

(2 Sheets)

Witnesses:
A. W. Almqvist
Francis McArdle

Inventor:
C. O. Hansen
per
Attorneys.

Sheet II. (2 Sheets)
[71.]
C. O. HANSEN.
Improvement in Sawing Machines.
No. 119,139. Patented Sep. 19, 1871.
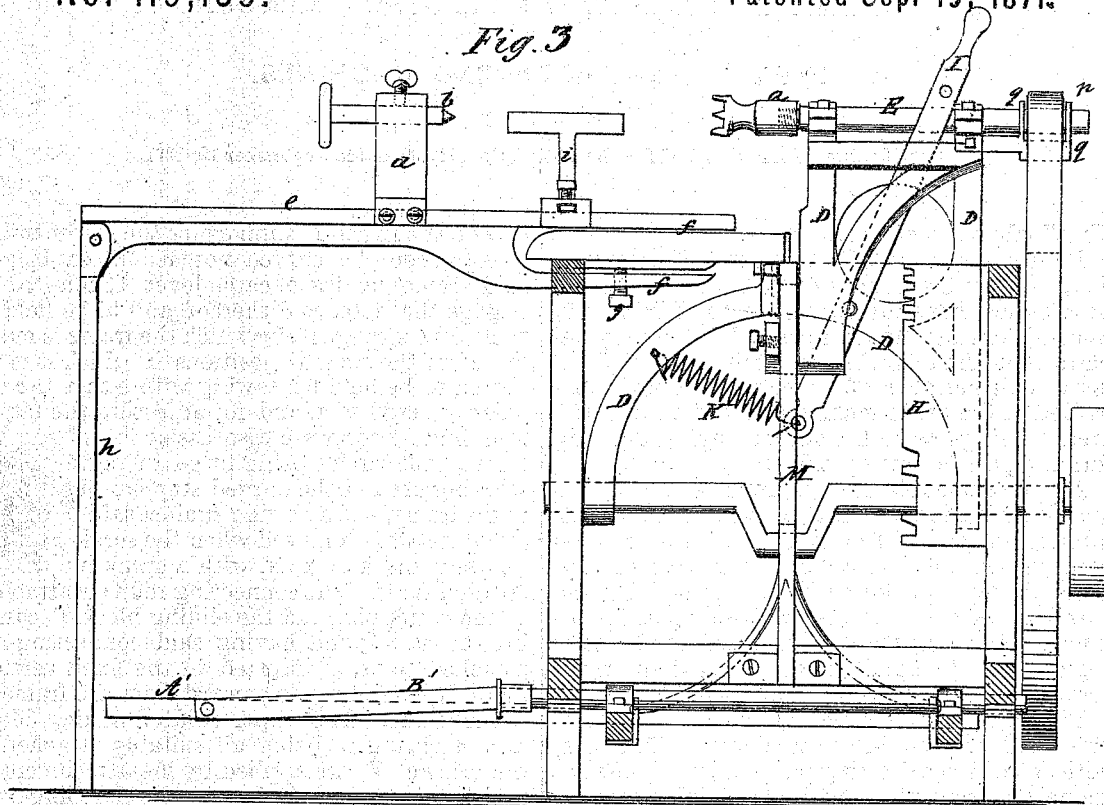
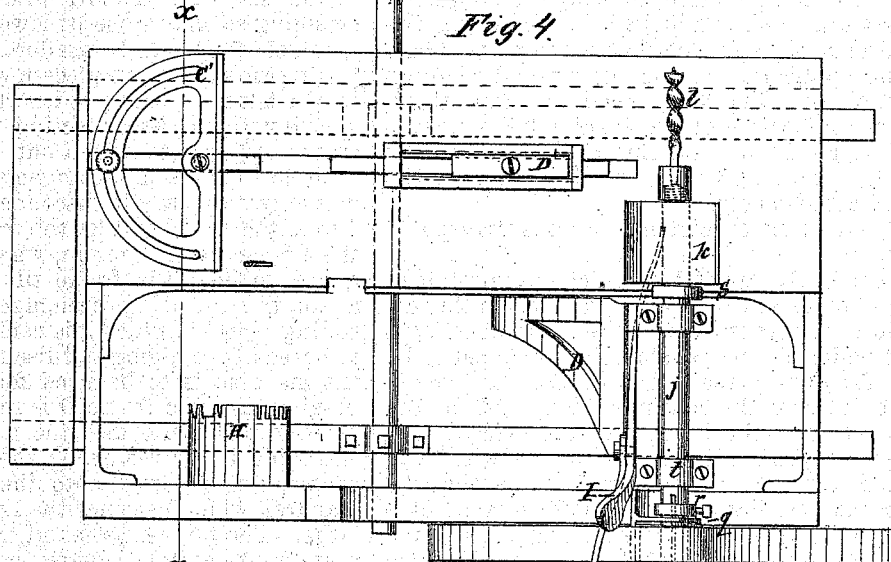

119,139

UNITED STATES PATENT OFFICE.

CHRISTIAN O. HANSEN, OF FERGUSON, MISSOURI.

IMPROVEMENT IN SAWING-MACHINES.

Specification forming part of Letters Patent No. 119,139, dated September 19, 1871.

*To all whom it may concern:*

Be it known that I, CHRISTIAN O. HANSEN, of Ferguson, in the county of St. Louis and State of Missouri, have invented a new and Improved Wood-Working Machine; and I do hereby declare that the following is a full, clear, and exact description thereof, which will enable others skilled in the art to make and use the same, reference being had to the accompanying drawing forming part of this specification.

My invention relates to improvements in wood-working machinery; and it consists in the adaptation of a rotary sawing-machine for the employment of the saw-mandrel as the driving-shaft of a scroll-saw, the power being applied by the saw driving-gear, and the scroll-saw and its adjuncts being detachably connected to the sawing-machine to admit of adjusting it either for scroll or circular sawing, or for other work.

Figure 1:
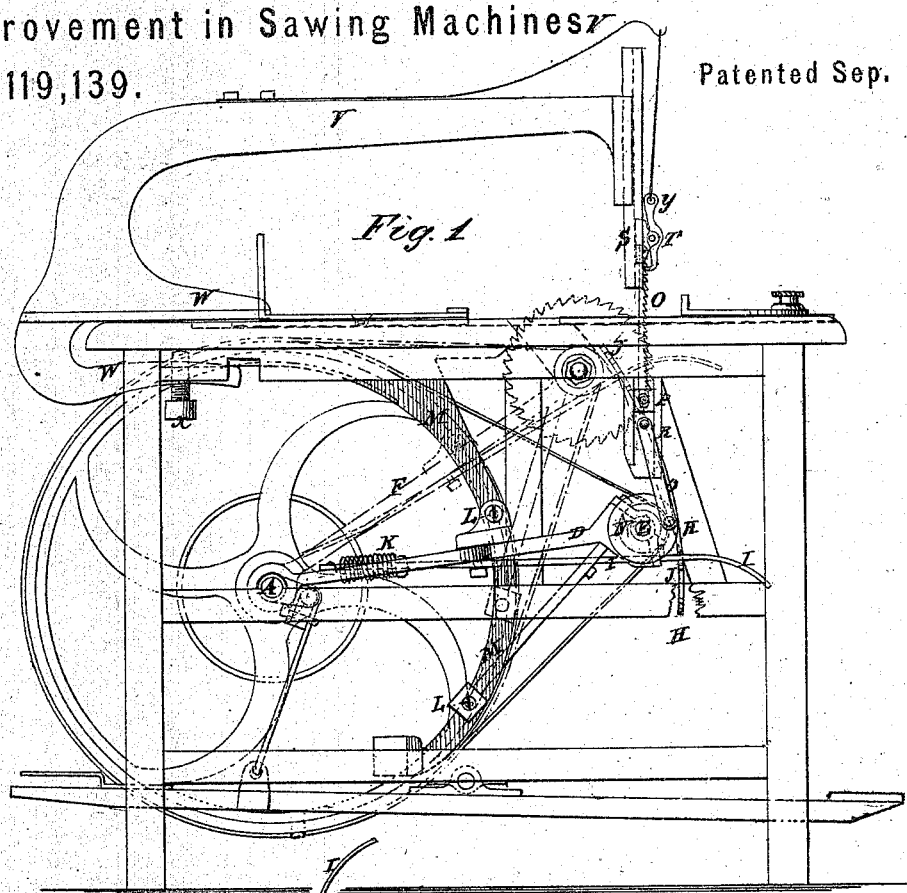
Figure 2:
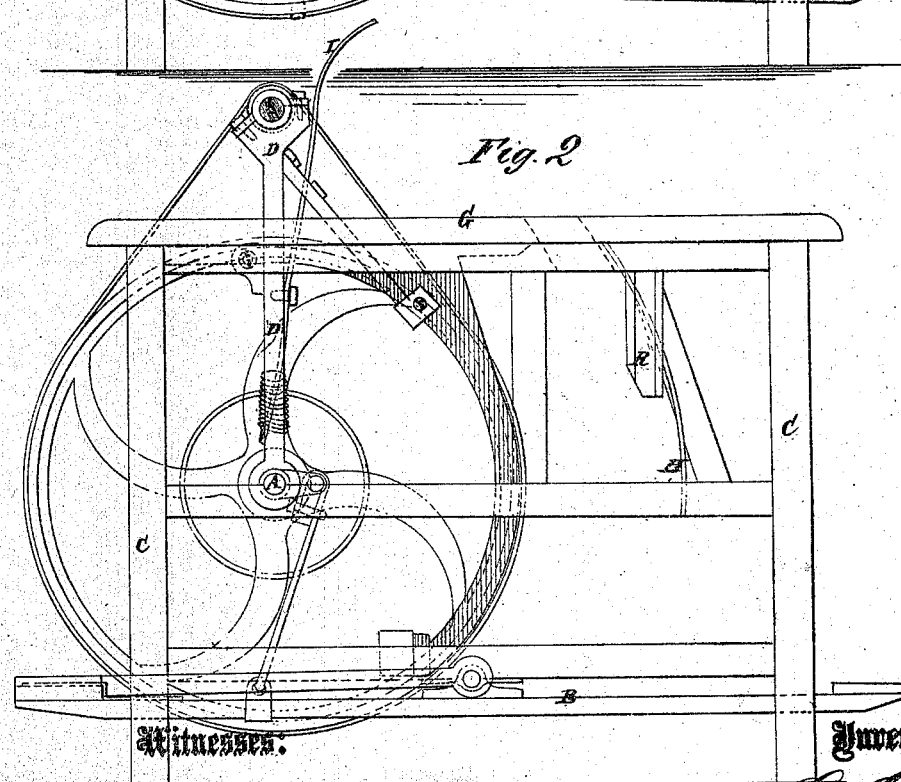

Figure 1 is a side elevation of the sawing-machine with the scroll-saw attachment in full lines, with dotted lines showing the position of the saw-frame and saw when used for circular sawing. Fig. 2 is a side elevation, showing the position of the saw-frame when adjusted for employing the mandrel as the spindle of a tenoning-lathe; also for the application of the boring and planing-mandrel, &c. Fig. 3 is an end elevation, showing the application of the turning-lathe attachments and the adjustment of the sawing-gear therefor; and Fig. 4 is a plan view, showing the boring attachments.

Similar letters of reference indicate corresponding parts.

A is the driving-shaft, to which the power may be applied in any approved way; but in this example it is represented as being applied by a foot-treadle, B, the treadle being arranged to be worked by two persons, one on each of two opposite sides of the machine. The said shaft is mounted upon the framing of the table C, and it supports the oscillating frame D, in which the circular-saw mandrel E is mounted, so that the latter may oscillate about ninety degrees of a circle, or between a horizontal and vertical position. When used for circular sawing said frame is adjusted to the position indicated by dotted lines F, Fig. 1, and one part of the table G, which is removable, is retained for supporting the stuff to be sawed on each side of the saw, being supported on one side by the permanent part. The end of the frame D supporting the saw-mandrel sweeps around a curved notched plate, H, and said frame carries a catch-lever, I, adapted to engage the notches J thereof, and to be held in them by a spring, K, by which the frame is maintained in the several positions in which it is required to be held for sawing with either the circular or scroll-saw, and for adjusting the latter. The binding-screws L also assist in holding the frame, said screws being fitted in parts thereof working around the curved stay-bar M attached to the frame, and screwing against said bar. The circular-saw is removed when the scroll-saw is to be used, and a disk, N, with a crank-pin, is substituted for it. The connecting-rod O is attached to the crank-pin, and the sliding block P, carrying the saw Q and having said connecting-rod attached to it, is inserted in the fixed vertical guide R extending downward from the frame of the machine. The upper guide S sliding block T, and spring U, being all suitably attached to the bracket V, are applied by the attachment of said bracket, which is done by the clamping-jaws W and screw X. The frame D, being capable of swinging so as to raise or lower the mandrel or crank-shaft E and saw, affords a means for adjusting the saw when a piece of work is being done in which it is necessary to insert the saw through a hole without disconnecting it from the lower cross-head and taking it out, as it is necessary to do in the present arrangement. In this case it is only necessary to disconnect the catch-lever I from the bar H and let the frame drop, say, to the lowest notch therein, where it may be engaged to hold the frame till it is to be raised again, the saw being disengaged from the upper sliding block, to which it is connected by a hook, $y$, for readily engaging and disengaging it. When the machine is to be used for turning, boring, planing, &c., the frame D is raised to a vertical position and made fast, the detachable part of the table being removed; then, for turning, a center, $a$, is screwed onto the end of the saw-mandrel, which becomes the live spindle of the lathe. The tail center $b$ and the sliding block $d$ therefor are attached by means of the bed piece $e$ clamped to the table by the jaws $f$ and screw $g$, and supported at the outer end by the legs $h$. This piece also carries the tool-rest $i$. For boring, planing, molding, tenoning, rabbeting, &c., a mandrel, $j$, is substituted for the one E, and adapted for the application of a planing tool, or any molding, tenoning, or rabbeting tool in place of it; also, for the application of augers $l$ at the end; and it is adapted for sliding in its bearings for working the augers; and to slide it back and forth the lever $i$ is connected to it by a bar, $m$, and the collar $n$, the latter being so attached as to allow it to turn freely, moving it endwise; and for allowing it to so move without displacing the driving-pulley $p$ the latter is fitted so that the mandrel will slide in it, and the arms $q$ are provided to hold the pulley while the mandrel slides. When the mandrel is to be employed for planing, &c., a collar, $r$, is fixed on it, against one of the bearings $t$, to prevent end motion in one direction. A collar, $s$, prevents such motion in the other direction. The foot-treadle is provided with an extension, A', of the foot-board, and a brace, B', therefor, on the side near the lathe attachment, for enabling the turner to work the treadle while turning long pieces requiring him to stand near the outer end of the bed piece $e$. C' and E' represent gauges attached to the top of the table for controlling the work.

Having thus described my invention, I claim as new and desire to secure by Letters Patent—

The vibrating saw-frame D, driving-shaft A, notched plate H, and catch-lever I, combined and arranged together and with the table, all substantially as specified.

C. O. HANSEN.

Witnesses:
S. W. HUTCHINSON,
WM. H. ELDER.

(71.)